United States Patent
Pfister

(10) Patent No.: US 9,032,100 B2
(45) Date of Patent: May 12, 2015

(54) I/O HUB-SUPPORTED ATOMIC I/O OPERATIONS

(75) Inventor: Gregory F. Pfister, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1328 days.

(21) Appl. No.: 12/062,095

(22) Filed: Apr. 3, 2008

(65) Prior Publication Data

US 2009/0254680 A1    Oct. 8, 2009

(51) Int. Cl.
*G06F 3/00* (2006.01)
*G06F 13/38* (2006.01)

(52) U.S. Cl.
CPC ................................. *G06F 13/385* (2013.01)

(58) Field of Classification Search
CPC ...................................................... G06F 13/385
USPC .......................................................... 710/3, 5
See application file for complete search history.

(56) References Cited

U.S. PATENT DOCUMENTS

| | | | |
|---|---|---|---|
| 5,175,829 A | 12/1992 | Stumpf et al. | |
| 5,313,585 A | 5/1994 | Jeffries et al. | |
| 5,448,702 A * | 9/1995 | Garcia et al. | 710/100 |
| 5,513,368 A * | 4/1996 | Garcia et al. | 710/22 |
| 5,794,073 A * | 8/1998 | Ramakrishnan et al. | 710/40 |
| 6,430,657 B1 * | 8/2002 | Mittal et al. | 711/138 |
| 6,457,152 B1 | 9/2002 | Paley et al. | |
| 6,484,185 B1 * | 11/2002 | Jain et al. | 1/1 |
| 6,757,748 B1 * | 6/2004 | Hipp | 710/2 |
| 6,792,599 B2 * | 9/2004 | Poulsen et al. | 717/136 |
| 6,981,108 B1 * | 12/2005 | Zeira et al. | 711/152 |
| 7,007,151 B1 * | 2/2006 | Ely et al. | 711/202 |
| 7,047,351 B2 * | 5/2006 | Jeddeloh | 711/5 |
| 7,103,528 B2 * | 9/2006 | Motyka et al. | 703/26 |
| 7,210,006 B2 | 4/2007 | Cypher | |
| 7,228,391 B2 | 6/2007 | Silvera et al. | |
| 2002/0161955 A1 | 10/2002 | Beukema et al. | |
| 2004/0054822 A1 * | 3/2004 | Biran et al. | 710/15 |
| 2004/0168032 A1 * | 8/2004 | Lee et al. | 711/141 |
| 2004/0193734 A1 | 9/2004 | Barron et al. | |
| 2005/0273400 A1 * | 12/2005 | Blankenship et al. | 705/28 |
| 2007/0005908 A1 | 1/2007 | Lakshmanamurthy et al. | |
| 2008/0195780 A1 * | 8/2008 | Ajanovic et al. | 710/105 |

OTHER PUBLICATIONS

"PCI Express 3.0 Frequently Asked Questions" [online], PCI-SIG[retrieved on Apr. 2, 2008] retrieved from http://www.pcisig.com/news_room/faqs/pcie3.0_faq/.

* cited by examiner

*Primary Examiner* — Eric Oberly
(74) *Attorney, Agent, or Firm* — Mitch Harris, Atty at Law, LLC; Andrew M. Harris; Parashos T. Kalaitzis

(57) ABSTRACT

Atomic operations within an I/O device are supported by processor architectures that are not required to include specific atomic instructions, by issuing the atomic operations from an I/O hub. A descriptor that specifies the atomic operation and a target address is retrieved by, or sent to, the hub. A trigger event, which may be a programmed I/O write to the hub with an address of the descriptor, or the contents of the descriptor itself, causes the I/O hub to issue the atomic operation. When the atomic operation is complete on the I/O device interconnect, the result is returned to the hub and a host is notified. The host then retrieves the results of the atomic operation from the hub. The host notification can be performed by interrupt or by polling the hub until a status change is detected.

25 Claims, 3 Drawing Sheets

I/O HUB-SUPPORTED ATOMIC I/O OPERATIONS

BACKGROUND OF THE INVENTION

1. Field of the Invention

The present invention is related to computer peripheral device I/O operations, and more particularly to an I/O hub and its method of operation that provide for atomic I/O operations controlled by non-atomic processor operations.

2. Description of Related Art

Input/Output (I/O) operations between processors and peripheral devices such as storage subsystems, network interfaces and co-processing units that are connected to the processors via a hub or other bus interface have traditionally been performed using commands or transactions that do not modify I/O device storage in an uninterruptable (atomic) manner. Examples of such I/O device buses are peripheral component interconnect (PCI), including serial express versions such as PCI EXPRESS, HYPERTRANSPORT buses and the like. (PCI and PCI EXPRESS are trademarks of PCI-SIG, HYPERTRANSPORT is a trademark of Advanced Microdevices, Inc.) While some systems, such as INTEL Architecture (IA-32, IA64) processors provide bus locking or specific atomic operations at the processor bus level so that system integrity is maintained during operations by multiple processors, operations that are directed at devices and reflected on I/O device buses have typically not been atomic operations. (INTEL is a trademark of Intel Corporation.) Other architectures such as POWER processors have no atomic operations. (POWER is a trademark of International Business Machines Corporation.) The nature of "atomic" operations is that the instruction is complete in a single operation on the bus and the operation is non-interruptible, so that no other bus activity is permitted while the operation is executed.

Recently, atomic operations directed to device buses have been proposed that will permit, for example, faster interleave of interactions with devices such as coprocessors and dedicated hardware that accelerates certain functions within a processing system. The operations are atomic with respect to multiprocessing within the device, which may contain one or more processors, and/or which may perform simultaneous operations on data within device memory.

The support of atomic operations provides that multiple operations within the device can be performed while retaining data queues and operation results within the device memory without other synchronization mechanisms that typically only permit exclusive use of the device for one operation at a time or restrictive management of operation sequencing. In order to facilitate such atomic operations, atomic I/O operations are supported by the I/O device interconnect and devices connected by the I/O device interconnect. In processor architectures already supporting the issue of atomic operations on their system interconnects, those atomic operations can be used with some modification to operate on memory-mapped I/O in the devices. The processors cause an atomic operation to be issued to system interconnect, translated from the system interconnect to the I/O device, and in response, the device performs the atomic operation before control is relinquished, ensuring complete system integrity during the operation.

However, there are several drawbacks to the implementation of such systems. First, while all practical multiprocessor systems support atomic operations in some manner, not all multiprocessor systems do so by using system interconnects and instruction set architectures (ISAs) that support atomic operations directly. Therefore, inclusion of atomic I/O operations may not be practical or may be incompatible with a particular processor or system interconnect architecture. Second, since the device at which an atomic I/O operation is directed determines the completion of the atomic operation, interconnect under-utilization penalties can be very high for atomic I/O operations, since the atomic operation requires at least some system interconnect exclusivity while the atomic operation is performed. Finally, even if a particular ISA directly supports atomic operations, the atomic operations that the device is designed to use may include operations that are not present in the particular ISA.

Therefore, it would be desirable to provide a method and system that can issue and perform atomic operations on an I/O device interconnect without requiring the processor architecture to include specific atomic operations, without requiring the processor to support each atomic operation that may be required by any I/O device, and without incurring penalties associated with system interconnect exclusivity while an atomic I/O operation is performed.

BRIEF SUMMARY OF THE INVENTION

The invention is embodied in a system, an I/O hub and their method of operation.

The I/O hub includes control logic that receives a trigger event that triggers an atomic operation directed at a target device. The I/O hub may also be integrated within a device, or the functions of the I/O hub may be performed by an "originating" device that does not otherwise act as a hub, and is only connected to an I/O device interconnect (and not a system or other higher-level interconnect). Upon receiving the trigger event, the I/O hub or originating device retrieves a descriptor that specifies the target device and optionally a target location within the target device and the atomic operation to be performed. The descriptor may be retrieved from system memory at an address specified in the trigger event, which may be a programmed I/O write to a location corresponding to an address of the hub/originating device. Alternatively, the descriptor may be written to storage within the hub/originating device itself. In response to the trigger event, the hub issues the atomic instruction specified in the descriptor on the I/O device interconnect, targeting the specified target device, and optionally the target location within the target device. Upon completion of the atomic operation, the hub/originating device receives the result from the device and signals the host (e.g., a processor in the system) that the atomic operation is complete. The host then retrieves the result from the hub/originating device or another location where the hub has stored the result, such as in system memory. The host may be signaled by an interrupt, or the host may poll a location within the hub/originating device to determine whether or not the atomic operation is complete.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

Figure 1:
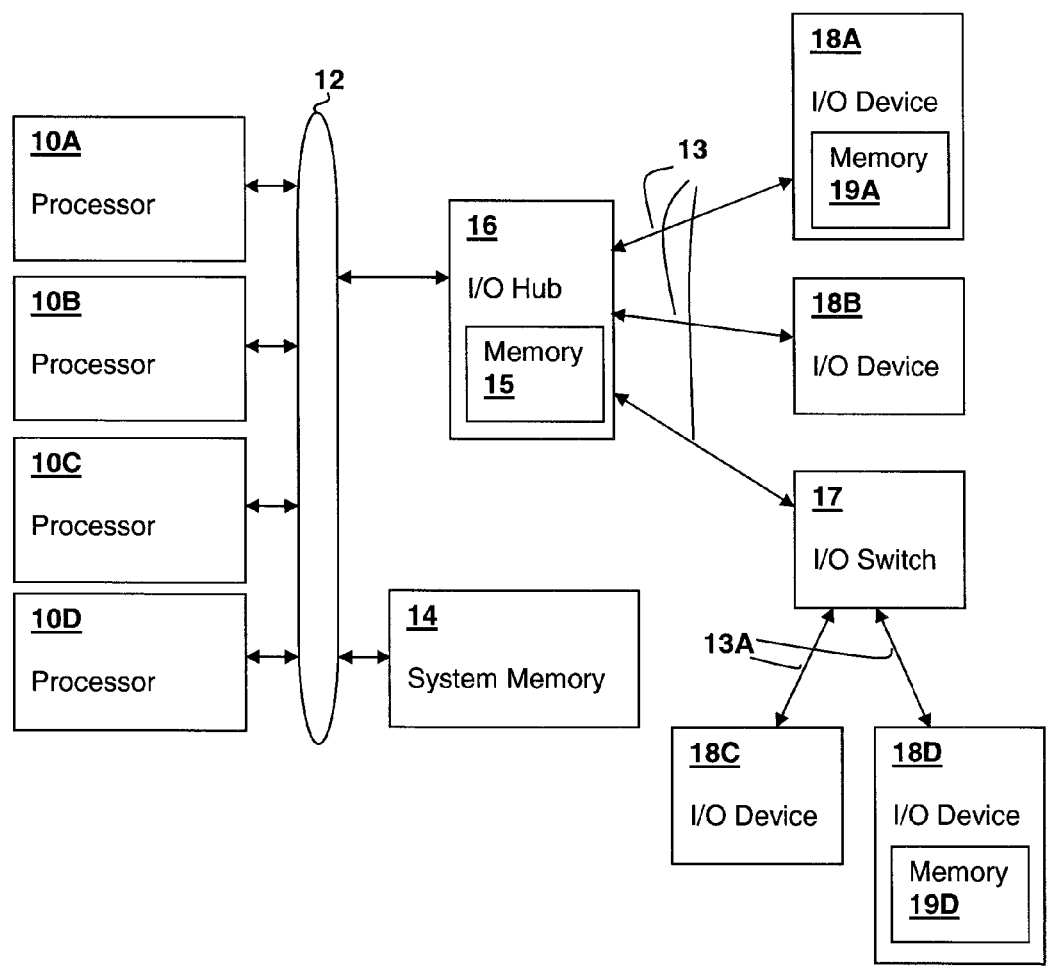
FIG. 1 is a block diagram illustrating a computer system in which techniques according to an embodiment of the present invention are practiced, and including an I/O hub 16 in accordance with an embodiment of the present invention.

The present invention relates to multiprocessor or uniprocessor systems that connect to devices via an I/O device hub that supports atomic operations on an I/O device bus or other interconnect. The atomic operations form part of the I/O device bus specification and the I/O devices may support the specified operations according to the needs of the device. Atomic operations are generated on the I/O device interconnect by the I/O device hub, without requiring atomic operations between the processors and the I/O device hub, which enables atomic I/O device interconnect operations in systems in which the processor instruction set does not include atomic I/O operations or possibly any atomic operations. The techniques and the I/O device hub of the present invention may also be used in systems that do include atomic I/O operations, to avoid delays that could otherwise occur due to locking the system interconnect while atomic I/O operations are performed. Since the I/O device interconnect and the devices, and not the system interconnect, controls when the atomic operation is complete, delays on the system interconnect due to atomic I/O operations are somewhat arbitrary and therefore the present invention can provide significant performance improvement in systems that could otherwise issue atomic I/O operations directly to the I/O device. The present invention also provides for extensibility of the set of atomic I/O operations supported by devices and I/O device interconnects, since the atomic operation are specified by data structures (e.g., atomic operation descriptors) and therefore do not require a specific modification to the processors' instruction set architecture in order to support particular atomic operations.

An atomic operation is issued by the I/O device hub in response to a trigger event generated by one of the system processors, and according to a descriptor that specifies the atomic operation and a target device. The descriptor may also specify a particular address (or sub-device) within the target device. When an atomic operation is complete, one of the system processors is signaled, so that the result of the operation may be retrieved from the hub. Further, the present invention extends to devices acting as hubs according to the present invention, for example, when an atomic operation descriptor is passed to a first device so that the first device will then issue an atomic operation to a second device. Such an architecture is particularly useful for backward compatibility in systems in which particular atomic operations are required or desirable in interacting with a first device, but the processors, system interconnect and existing hubs are not compatible with the particular atomic operations. A second device can be provided that issues the particular atomic operations to the first device in response to an atomic operation descriptor and a trigger event received from a processor. The second device acts as a hub according to the present invention, and may provide additional device functionality, or may be an "atomic operation generator" device specifically provided for the purpose of issuing atomic operations to other devices.

Referring now to FIG. 1, a multi-processing system in accordance with an embodiment of the present invention is shown. A plurality of processors 10A-10D are coupled by a local system bus 12. A system memory 14 is also coupled to local system bus 12. An I/O hub 16 in accordance with an embodiment of the present invention couples local system bus 12 to a plurality of I/O device buses 13 that couple devices 18A and 18B to the system. While the illustrative embodiment uses local system bus 12 to provide communication between system memory 14, processors 10A-10D and I/O hub 16, it is understood that other forms of system interconnect fabric are contemplated by the present invention, and the use of the term "bus" is not limiting as to the form of interconnect provided between the processing system components. Additionally, an I/O switch 17 is coupled to I/O hub 16 by another I/O device bus 13 and I/O devices 18C and 18D are coupled to I/O hub 16 by I/O switch 17. In general, operations directed to I/O devices 18A-18D involve the transfer of data between system memory 14, or registers within processors 10A-10D, and device memory (e.g., buffers) in I/O devices 18A-18D, such as device memory 19A within I/O device 18A and device memory 19D within I/O device 18D. I/O hub 16 includes control logic and/or a processor and programming instructions that implement the operations described in further detail below, which issue atomic operations on I/O device buses 13 in response to a trigger event generated by one of processors 10A-10D. I/O hub 16 also includes a hub memory 15 that stores data structures used in embodiments of the present invention, but also may be used for buffering data transferred between system memory 14 and devices 18A-18D. However, I/O data buffering is not a requirement of the present invention, as I/O hub 16 of the present invention is capable of performing atomic operations on I/O device buses 13 with or without buffering the data transferred between system memory 14 and devices 18A-18D within I/O hub 16. I/O Hub 16 may also implement other non-atomic I/O operations such as READ, WRITE, and CONFIGURE, as are commonly known in the art. In implementing such non-atomic operations, I/O hub 16 may use logic and storage that is also used for implementing the atomic operations. However, such architecture is not a requirement of the present invention and separate logic and storage may be provided exclusively for atomic operations.

Figure 2:
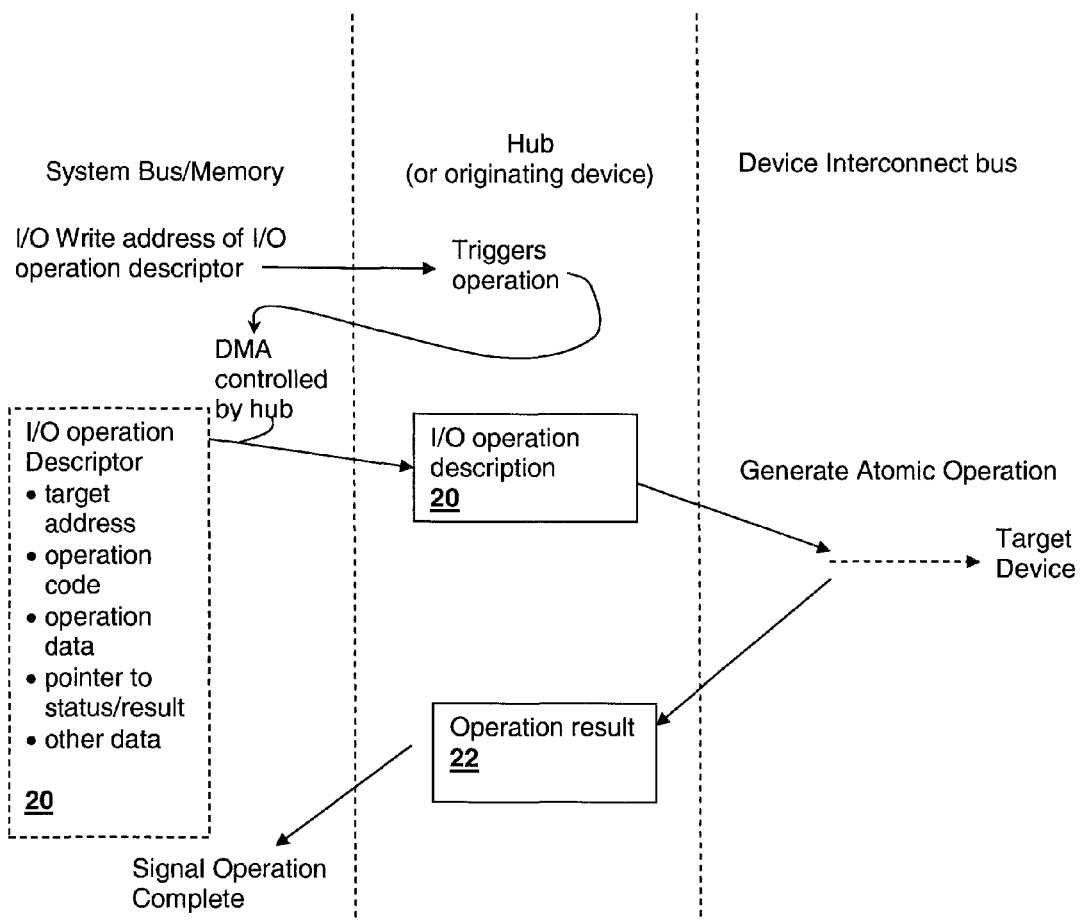
FIG. 2 is a pictorial diagram showing a relationship of operations within the system of FIG. 1.

With further reference to FIG. 2, operation of the system of FIG. 1, and in particular, features of I/O hub 16 are illustrated. An I/O operation descriptor 20 is constructed by one of processors 10A-10D in system memory 14, which is acting as a host processor for the transaction. A trigger event, which in the illustrated embodiment is an I/O write operation to I/O device hub 16, is issued to I/O hub 16, which includes the address of I/O operation descriptor 20 in system memory 14. I/O hub 16 then performs a direct memory access (DMA) transfer of I/O operation descriptor 20 to hub memory 15. Alternatively, operation descriptor 20 may be transferred directly to hub memory 15 by an I/O write operation with the last I/O write (if multiple writes are required) providing the trigger event, e.g., by triggering on a specific address in hub memory 15 to which a final word of I/O operation descriptor 20 is written. Operation descriptor 20 is a data structure that includes at least a specific atomic I/O operation specifier (operation code) and a target device ID or address, but may contain data one or more data pointers for data sent and returned in association with the atomic operation, including a pointer/index to a location to poll for completion status. When the trigger event is received, I/O hub 16 generates the atomic operation directed to the target device on the particular I/O device bus 13 that couples the target device to I/O hub 16. When the atomic operation is complete, the result is returned to I/O hub 16 and one of processors 10A-10D is notified that the atomic operation is complete. The notification can be provided by an interrupt generated by I/O hub 16 or the target device, or by a status bit within I/O hub 15 that is polled by one of processors 10A-10D. Once notification of completion is received, the result of the operation can be retrieved from I/O hub 15. The result may be completion status-only, or any data returned by the operation can be transferred to system memory 14 during the operation by DMA transfer through I/O hub 15 from one of devices 18A-18D to system memory 14.

The types of atomic operations that may be included in an I/O bus instruction set, and therefore generated by a hub in accordance with an embodiment of the present invention, may be common atomic operations such as compare-and-swap and fetch-and-add, but operate on device memory/device registers, rather than on system memory and are atomic within the device itself. The data or fields associated with the instruction are generally included within the descriptor, such as the increment for fetch-and-add or the comparison value for compare-and-swap, and may be of variable size. The status bit for completion (if polling is employed) or its address may need to form part of the descriptor transferred to the hub, so that the status bit is reset before the operation by the descriptor transfer and is set by the device at completion. Atomic operations may also be queued within the hub, by providing a single "atomic" location that causes a descriptor to be "pushed" onto a queue of atomic device requests, allowing bursts of requests from the host processors to be accepted in rapid succession. The operations can then be individually completed (each atomic within its corresponding I/O device) without holding the system bus/interconnect in a locked state. Since serialization of host resources is not required, the system bus/interconnect can proceed after an atomic operation has been accepted by the hub, which is another reason why the technique of the present invention provides advantages even in systems having host processors that support atomic operations.

In an alternative embodiment of the invention, an originating device such as I/O device 18D of FIG. 1 receives an atomic operation descriptor from one of processors 10A-10D, and then issues an atomic operation to another device, e.g., I/O device 18C. I/O device 18D may be a special-purpose device, e.g., an "atomic operation generator" that is packaged as a stand-alone device, or may represent functionality integrated within an I/O device that is not a "hub" in the ordinary sense of the term, but nevertheless operates as a hub according to the above description of the present invention in issuing atomic operations to another device. Other than the structural difference of not being interposed between the system interconnect or higher-level I/O interconnect and the target device, the operation of a device in accordance with the alternative embodiment of the invention is similar to the operation of the above-described hub, in that an atomic operation descriptor is issued from a device, e.g., device 18D and a peer-to-peer (or other device to device) operation is conducted to trigger the target device 18C to perform an atomic operation.

Figure 3:
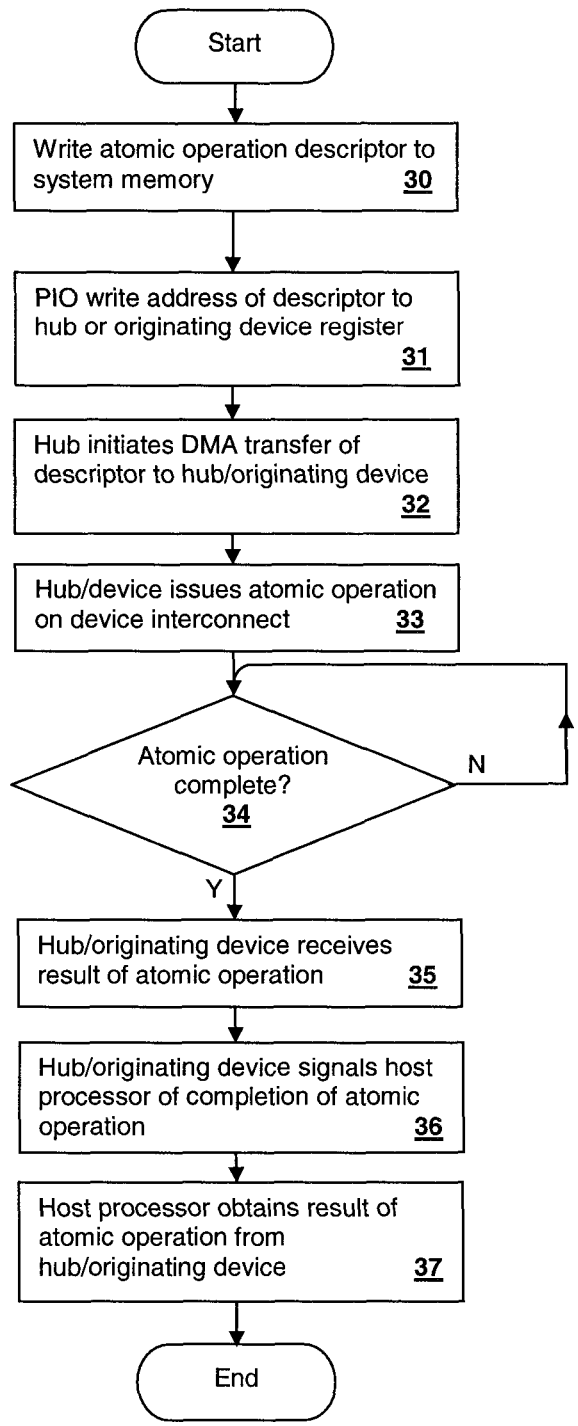
FIG. 3 is a flow chart of a method in accordance with an embodiment of the present invention.

Referring now to FIG. 3, a method in accordance with an embodiment of the invention is illustrated in a flowchart. First, the atomic operation descriptor is written to system memory (step 30). Next, a programmed I/O (PIO) write of the address of the descriptor is made to a register in the hub or originating device (step 31). The hub (or originating device) then initiates a DMA transfer of the descriptor to storage in the hub or device (step 32) and then issues the atomic operation specified in the descriptor to the target device (and optionally the target device address or sub-unit) identified in the descriptor (step 33). When the I/O device signals the hub (or originating device) that the atomic operation is complete (decision 34), then the hub (or originating device) receives the result of the operation (step 35). The hub (or originating device) then signals a host processor that the atomic operation is complete (step 36). Finally, the host processor obtains the results of the atomic operation (step 37).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for issuing atomic operations to devices coupled to a processing system by an I/O device interconnect, wherein the method comprises:
   triggering by a host processor of the processing system, in an originating device coupled to the I/O device interconnect, the issuance of a particular atomic instruction specifying an atomic I/O operation to be performed atomically over the I/O device interconnect between the originating device and a target device;
   responsive to the triggering, retrieving a descriptor specifying the target device and the particular atomic instruction;
   responsive to the retrieving, issuing the particular atomic instruction from the originating device to the target device on the I/O device interconnect;
   performing the atomic I/O operation by the target device, wherein the I/O device interconnect is operated in an exclusive manner while the atomic I/O operation is being performed to preserve the atomicity of the atomic I/O operation;
   receiving, at the originating device, an indication that the atomic I/O operation on the I/O device interconnect is complete; and
   notifying the host processor that the originating device has received the indication that the atomic I/O operation on the I/O device interconnect is complete.

2. The method of claim 1, wherein the originating device is a hub interposed between a system interconnect and the I/O device interconnect.

3. The method of claim 1, wherein the originating device is a peer to the target device that is coupled to the I/O device interconnect.

4. The method of claim 1, wherein the triggering is performed by issuing a programmed I/O write to the originating device from the host processor, wherein the programmed I/O write includes an address of the descriptor in a system memory coupled to the host processor, and wherein the retrieving comprises performing a direct memory access transfer of the descriptor from the system memory to a storage within the originating device.

5. The method of claim 1, wherein the triggering is performed by issuing a programmed I/O write to the originating device from the host processor, wherein the programmed I/O write includes the descriptor, wherein the method further comprises storing the descriptor in a storage within the originating device, and wherein the retrieving comprises retrieving the descriptor from the storage.

6. The method of claim 1, wherein the descriptor includes an address specifying a location within the target device at which to direct the atomic operation.

7. A computer system, comprising:
   at least one processor coupled to a system interconnect;
   a system memory coupled to the system interconnect;
   an originating device coupled to an I/O device interconnect; and
   a target device coupled to the originating device by the I/O device interconnect, and wherein the originating device is responsive to a trigger event generated by the at least one processor to initiate an atomic operation on the I/O device interconnect between the originating device and the target device by issuing a particular atomic instruction specifying the atomic I/O operation, wherein the originating device retrieves a descriptor specifying the target device and containing the particular atomic instruction specifying the atomic operation to perform, wherein the originating device generates the atomic operation on the I/O device interconnect in response to the trigger event, wherein the target device performs the atomic I/O operation such that the I/O device interconnect is operated in an exclusive manner while the atomic I/O operation is being performed to preserve the atomicity of the atomic I/O operation, wherein the originating device receives an indication that the atomic operation on the I/O device interconnect is complete, and signals the least one processor when the atomic operation on the I/O device interconnect is complete.

8. The computer system of claim 7, wherein the originating device is an I/O hub interposed between the system interconnect and the I/O device interconnect.

9. The computer system of claim 7, wherein the originating device is a peer to the target device that is coupled to the I/O device interconnect.

10. The computer system of claim 7, wherein the trigger event is a programmed I/O write issued to the originating device from the at least one processor, wherein the programmed I/O write includes an address of the descriptor in the system memory, and wherein the originating device retrieves the descriptor by performing a direct memory access transfer of the descriptor from the system memory to a storage within the originating device.

11. The computer system of claim 7, wherein the trigger event is a programmer I/O write issued to the originating device from the at least one processor, wherein the programmed I/O write transfers the descriptor to the originating device, wherein the descriptor is stored in a storage within the originating device, and wherein the originating device retrieves the descriptor from the storage.

12. The computer system of claim 7, wherein the descriptor includes an address specifying a location within the target device at which to direct the atomic operation.

13. A device, comprising:
   an I/O device interconnect interface for coupling the device to a target device via an I/O device interconnect, wherein the device is further coupled to a system interconnect that couples the device to at least one external processor; and
   control logic responsive to a trigger event received from the at least one external processor to initiate an atomic operation on the I/O device interconnect to the device, wherein in response to the trigger event, the control logic retrieves a descriptor specifying the target device and containing a particular atomic instruction specifying the atomic I/O operation to perform on the I/O device interconnect and transmits the particular atomic instruction on the I/O device interconnect to the target device in response to the trigger event, wherein the I/O device interconnect is operated in an exclusive manner while the atomic I/O operation is being performed to preserve the atomicity of the atomic I/O operation, and wherein the control logic further receives an indication that the atomic operation on the I/O device interconnect is complete, and signals the at least one external processor when the atomic operation on the I/O device interconnect is complete.

14. The device of claim 13, wherein the device is a hub further comprising a system interconnect interface for coupling the device to the system interconnect, wherein the device is interposed between the system interconnect and the target device.

15. The device of claim 13, wherein the device is a peer to the target device, wherein the device and the target device are coupled to the system interconnect by the I/O device interconnect.

16. The device of claim 13, wherein the control logic comprises a processor coupled to a program memory, and wherein the program memory includes program instructions for performing operations of the control logic.

17. The device of claim 13, wherein the trigger event is a programmed I/O write issued to the device, wherein the programmed I/O write includes an address of the descriptor in the system memory, and wherein the control logic retrieves the descriptor by performing a direct memory access transfer to transfer the descriptor from the system memory to a storage within the originating device.

18. The device of claim 13, wherein the trigger event is a programmed I/O write issued to the device, wherein the programmed I/O write transfers the descriptor to a storage within the device, and wherein the control logic retrieves the descriptor from the storage.

19. The device of claim 13, wherein the descriptor includes an address specifying a location within the target device at which to direct the atomic operation.

20. A computer program product comprising a memory storing program instructions for execution by a processor within a computer system including a system memory and coupled to an originating device and a target device, wherein the program instructions comprise program instructions for:
   initializing a descriptor specifying the target device and containing a particular atomic instruction specifying an atomic operation to perform on an I/O device interconnect that couples the originating device to the target device;
   triggering the originating device to issue a-n the particular atomic instruction specifying the atomic I/O operation on the I/O device interconnect to the target device, wherein the I/O device interconnect is operated in an exclusive manner while the atomic I/O operation is being performed to preserve the atomicity of the atomic I/O operation; and
   retrieving a result of the atomic operation.

21. The computer-program product of claim 20, wherein the program instructions for initializing write the descriptor to system memory, and wherein the program instructions for triggering are program instructions for performing an I/O write operation to the originating device including an address of the descriptor in system memory, whereby the originating device retrieves the descriptor by performing a direct memory access transfer.

22. The computer-program product of claim 20, wherein the program instructions for triggering are program instructions for performing an I/O write operation to the originating device including the content of the descriptor, whereby the originating device stores the descriptor internally.

23. The computer-program product of claim 20, wherein the descriptor includes an address specifying a location within the target device at which to direct the atomic operation.

24. An atomic operation compatibility device for connection to an I/O device interconnect that supports atomic operations issued to target devices connected to the I/O device interconnect, the atomic operation compatibility device for communication with an external processor, wherein the external processor need not have an instruction set supporting the atomic operations issued to the target devices, the atomic operation compatibility device comprising:
- an I/O device interconnect interface for coupling the atomic operation compatibility device to the I/O device interconnect and receiving commands from an external processor through the I/O device interconnect; and
- control logic responsive to a trigger event received from the external processor to initiate an atomic operation on the I/O device interconnect with to the target device, wherein in response to the trigger event, the control logic retrieves a descriptor specifying a particular target device and containing a particular atomic instruction specifying an atomic operation to transmit to the particular target device, wherein the atomic operation compatibility device transmits the particular atomic instruction on the I/O device interconnect to the target device in response to the trigger event, wherein the I/O device interconnect is operated in an exclusive manner while the atomic I/O operation is being performed to preserve the atomicity of the atomic I/O operation, and wherein the control logic further receives an indication that the atomic operation on the I/O device interconnect is complete, and signals the external processor when the atomic operation on the I/O device interconnect is complete.

25. The atomic operation compatibility device of claim 24, wherein the control logic comprises an internal processor coupled to a storage within the atomic operation compatibility device, wherein the storage contains program instructions for execution by the internal processor for carrying out the operations of the control logic.

* * * * *